J. R. SPEER.
Sheep-Protector.
No. 216,235. Patented June 3, 1879.
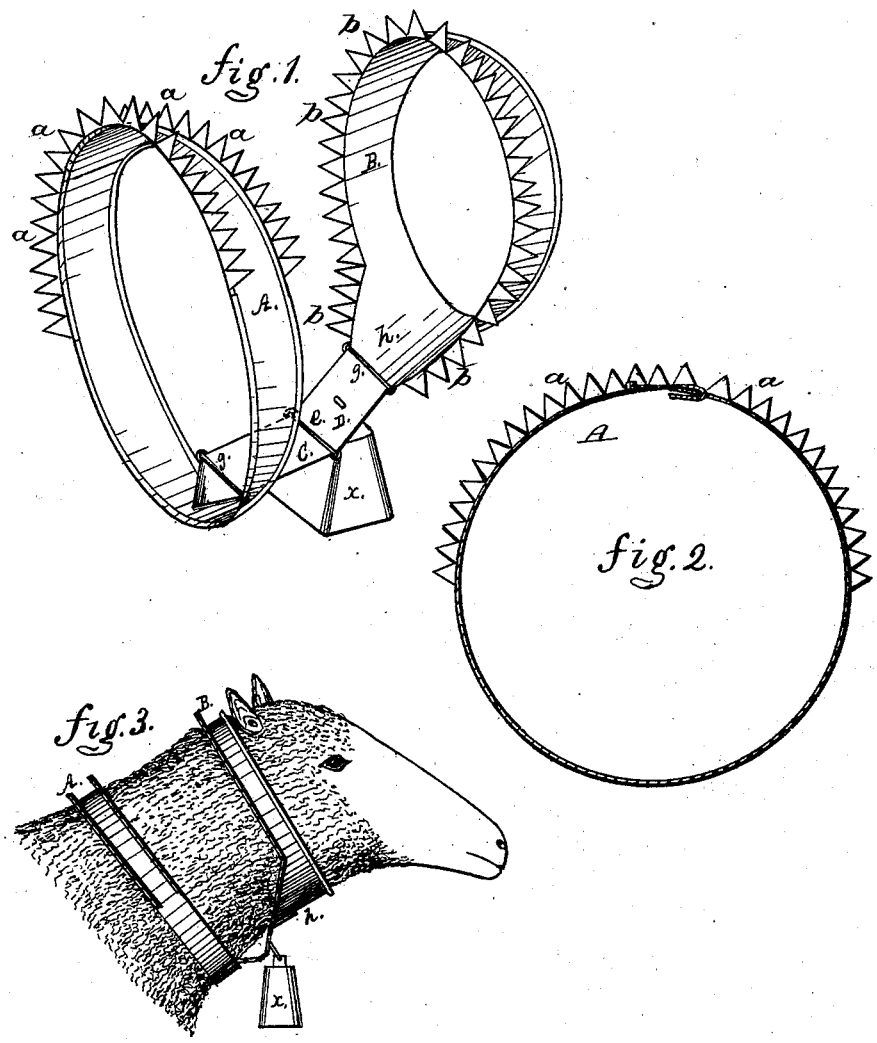
Witnesses
D. C. Allen
A. L. Allen
Inventor
James R. Speer
By J. J. Johnston
his attorney

UNITED STATES PATENT OFFICE.

JAMES R. SPEER, OF PITTSBURG, PENNSYLVANIA.

IMPROVEMENT IN SHEEP-PROTECTORS.

Specification forming part of Letters Patent No. 216,235, dated June 3, 1879; application filed November 8, 1878.

*To all whom it may concern:*

Be it known that I, JAMES R. SPEER, of the city of Pittsburg, county of Allegheny, and State of Pennsylvania, have invented certain new and useful Improvements in Sheep-Protectors; and I do hereby declare the following to be a full, clear, and exact description of the same, reference being made to the accompanying drawings, forming a part of this specification, and in which—

Figure 1 represents a perspective view of my improved sheep-protector; Fig. 2, a cross-section of one of the collars of the same; Fig. 3, a view showing the protector as applied to a sheep.

My invention relates to improvements in sheep-protectors; and the invention consists of two collars provided with serrated flanges, and coupled together by hinged pieces, the forward collar having an extension for protecting the throat of a sheep, the whole being constructed, arranged, and operating in relation to each other as hereinafter fully described.

It is well known that a dog usually attacks a sheep seizing it by the throat at the point where the large blood-vessels are located, and it seems to have an instinctive knowledge of said vital parts, and seldom doing more than lacerating the throat of the sheep sufficiently to cut the large blood-vessels and lap the blood, which seems to satisfy it.

The object, therefore, of my invention is to protect the throat of a sheep at the vital points, or where the attack is usually made, so that in case the dog does make an attack the serrated collars will so lacerate its mouth and cause such pain that it will cease its attack.

In the drawings, A and B represent the two collars of the protector, and which are to be placed around or on a sheep's neck. These collars are provided with serrated flanges $a\ b$, and the collar B with a serrated shield or extension, $h$, projecting toward the collar A, said collars being connected together by the pieces C D, which are hinged together at $e$, and respectively hinged to the collars at $g\ g$, all as clearly shown in Fig. 1, whereby the collars are adapted to be adjusted on the sheep's neck.

X represents a bell, connected to the hinged pieces C D, for the purpose of noting the whereabouts of the sheep.

It will therefore be readily perceived that the serrated flanged collars and the serrated shield or extension thereof covering the vital parts of a sheep's throat when applied to the neck of the sheep form an effective protection against the attacks of dogs, the serrated flanges lacerating the mouth of a dog in making an attack, and causing it such pain that it will cease its attack.

Having thus described my improvement, what I claim is—

1. A sheep-protector consisting of the collars A B, coupled together on the under side of the throat of the sheep, substantially as herein described, and for the purpose set forth.

2. A sheep-protector consisting of the collars A B, coupled together by pieces C D, pivoted to the collars at $g\ g$ and hinged at $e$, substantially as herein described, and for the purpose set forth.

3. The serrated flanged collar B, having a serrated flanged shield or extension, $h$, substantially as and for the purpose herein shown and described.

JAMES R. SPEER.

Witnesses:
A. C. JOHNSTON,
D. C. ALLEN.